(12) United States Patent
Carlino et al.

(10) Patent No.: US 8,508,891 B2
(45) Date of Patent: Aug. 13, 2013

(54) TRIP UNIT PROVIDING REMOTE ELECTRICAL SIGNAL TO REMOTELY INDICATE THAT AN ARC REDUCTION MAINTENANCE MODE IS REMOTELY ENABLED, AND ELECTRICAL SWITCHING APPARATUS INCLUDING THE SAME

(75) Inventors: Harry J. Carlino, Export, PA (US);
David R. Olenak, Bridgeville, PA (US);
Lloyd A. Maloney, Beaver, PA (US);
Brian S. Caffro, Aliquippa, PA (US)

(73) Assignee: Eaton Corporation, Cleveland, OH (US)

( * ) Notice: Subject to any disclaimer, the term of this patent is extended or adjusted under 35 U.S.C. 154(b) by 383 days.

(21) Appl. No.: 13/004,398

(22) Filed: Jan. 11, 2011

(65) Prior Publication Data

US 2012/0176719 A1 Jul. 12, 2012

(51) Int. Cl.
*H02H 3/00* (2006.01)

(52) U.S. Cl.
USPC .................................. 361/42; 361/2; 361/115

(58) Field of Classification Search
None
See application file for complete search history.

(56) References Cited

U.S. PATENT DOCUMENTS

| | | | |
|---|---|---|---|
| 5,341,191 A | 8/1994 | Crookston et al. | |
| 5,910,760 A | 6/1999 | Malingowski et al. | |
| 6,144,271 A | 11/2000 | Mueller et al. | |
| 6,777,627 B1 * | 8/2004 | Stevenson | 200/50.21 |
| 7,203,040 B2 | 4/2007 | Shipp et al. | |
| 7,570,465 B2 | 8/2009 | Beatty, Jr. et al. | |
| 8,351,171 B2 * | 1/2013 | Payack | 361/62 |
| 2007/0097582 A1 | 5/2007 | Shipp et al. | |
| 2007/0110111 A1 | 5/2007 | Shipp et al. | |
| 2008/0142486 A1 * | 6/2008 | Vicente et al. | 218/154 |
| 2008/0310056 A1 * | 12/2008 | Kumfer et al. | 361/6 |
| 2009/0154046 A1 | 6/2009 | Robinson et al. | |
| 2009/0195337 A1 | 8/2009 | Carlino et al. | |
| 2010/0072355 A1 * | 3/2010 | Schweitzer et al. | 250/252.1 |
| 2010/0133922 A1 | 6/2010 | Payack | |

FOREIGN PATENT DOCUMENTS

| | | |
|---|---|---|
| EP | 1 936 768 A1 | 6/2008 |
| WO | 2007/104048 A2 | 9/2007 |
| WO | 2009/095774 A1 | 8/2009 |

OTHER PUBLICATIONS

European Patent Office, "International search report and Written Opinion", Jun. 19, 2012, 12 pp.

* cited by examiner

*Primary Examiner* — Jared Fureman
*Assistant Examiner* — Terrence Willoughby
(74) *Attorney, Agent, or Firm* — Eckert Seamans Cherin & Mellott, LLC; Kirk D. Houser

(57) ABSTRACT

An electrical switching apparatus includes separable contacts; an operating mechanism structured to open and close the separable contacts; and a trip mechanism cooperating with the operating mechanism to trip open the separable contacts. The trip mechanism includes an input structured to receive a remote signal to remotely enable an arc reduction maintenance mode, a first circuit structured to enable the arc reduction maintenance mode in response to the received remote signal, and a second circuit structured to provide an electrical signal remote from the trip mechanism in order to remotely indicate that the arc reduction maintenance mode is remotely enabled.

19 Claims, 3 Drawing Sheets

TRIP UNIT PROVIDING REMOTE ELECTRICAL SIGNAL TO REMOTELY INDICATE THAT AN ARC REDUCTION MAINTENANCE MODE IS REMOTELY ENABLED, AND ELECTRICAL SWITCHING APPARATUS INCLUDING THE SAME

BACKGROUND

1. Field

The disclosed concept pertains generally to electrical switching apparatus and, more particularly, to electrical switching apparatus, such as circuit breakers, including a trip mechanism. The disclosed concept also relates to trip mechanisms, such as trip units, for circuit interrupters.

2. Background Information

Electrical switching apparatus include, for example, circuit switching devices; circuit interrupters, such as circuit breakers; network protectors; contactors; motor starters; motor controllers; and other load controllers. Electrical switching apparatus such as circuit interrupters and, in particular, circuit breakers of the molded case variety, are well known in the art. See, for example, U.S. Pat. No. 5,341,191.

Circuit breakers are used to protect electrical circuitry from damage due to an overcurrent condition, such as an overload condition or a relatively high level short circuit or fault condition. Molded case circuit breakers typically include a pair of separable contacts per phase. The separable contacts may be operated either manually by way of a handle disposed on the outside of the case or automatically in response to an overcurrent condition. Typically, such circuit breakers include an operating mechanism, which is designed to rapidly open and close the separable contacts, and a trip unit, which senses overcurrent conditions in an automatic mode of operation. Upon sensing an overcurrent condition, the trip unit trips the operating mechanism to a trip state, which moves the separable contacts to their open position.

Industrial circuit breakers often use a circuit breaker frame, which houses a trip unit. See, for example, U.S. Pat. Nos. 5,910,760; and 6,144,271. The trip unit may be modular and may be replaced, in order to alter the electrical properties of the circuit breaker.

It is well known to employ trip units which utilize a microprocessor to detect various types of overcurrent trip conditions and provide various protection functions, such as, for example, a long delay trip, a short delay trip, an instantaneous trip, and/or a ground fault trip. The long delay trip function protects the load served by the protected electrical system from overloads and/or overcurrents. The short delay trip function can be used to coordinate tripping of downstream circuit breakers in a hierarchy of circuit breakers. The instantaneous trip function protects the electrical conductors to which the circuit breaker is connected from damaging overcurrent conditions, such as short circuits. As implied, the ground fault trip function protects the electrical system from faults to ground.

Some known molded case circuit breakers (MCCBs) include a short delay time setting. The actual short delay trip time is intentionally delayed and has a minimum trip time of approximately 37 milliseconds resulting from the calculation time of a short delay algorithm performed by a microprocessor. The instantaneous feature of these MCCBs is provided by a fixed analog override circuit. A single zener diode is predetermined with a single fixed threshold value. The fixed analog override circuit detects a peak current value and initiates a trip in less than one line cycle. Because the zener diode is a fixed and non-adjustable component, the instantaneous trip threshold is set to a single fixed value.

U.S. Pat. No. 7,203,040 discloses a circuit breaker and trip unit including an arc reduction maintenance switch for reduction of arc flash energy and the severity of arc flash exposure. Specific trip functions are manually overridden with a maintenance trip function that reduces arc energy should a fault occur. The manually enabled and disabled maintenance trip function reduces the pickup currents of the specified trip functions and/or reduces or eliminates the time delays of the specified trip functions. For example, instantaneous trip is reduced from 10 times to 2 times rated current, short delay pickup is reduced from 8 times to 1.5 times rated current, the short time delay of 0.5 second is reduced to 0.050 second (essentially no time delay), the (equipment protection) ground fault pickup current is reduced from 0.5 times to 0.25 times rated current, and the ground fault time delay is reduced from 0.5 second to 0.050 second (essentially no time delay). As another example, instantaneous trip is reduced from 10 times to 4 times rated current, short delay pickup is reduced from 8 times to 3 times rated current, the short time delay of 0.5 second is reduced to 0.050 second (essentially no time delay), the (equipment protection) ground fault pickup current is reduced from 0.5 times to 0.25 times rated current, and the ground fault time delay is reduced from 0.5 second to 0.050 second (essentially no time delay). A light emitting diode (LED) is energized with the maintenance switch in the maintenance position to alert personnel of the change in the trip function. Other means for signaling the implementation of the maintenance trip functions can be provided such as a text message where the trip unit has a visual display.

A known arc flash reduction mode allows a user to remotely enable a relay inside a trip unit in order to place an instantaneous setting of the trip unit into its lowest maintenance mode position (e.g., 2.5 times the frame rating). This relatively very low setting will allow the circuit breaker to interrupt and clear a fault containing the least possible amount of arc flash energy. This reduction in arc flash energy offers relatively greater protection to personnel working in near proximity to the circuit breaker. When remotely enabled, a blue light emitting diode (LED) on the trip unit faceplate lights when the relay is remotely enabled. This lit LED verifies that the trip unit has been placed into the lowest instantaneous arc flash reduction mode and, thus, that the circuit breaker can be safely approached. However, the LED might become covered over and/or blocked from view if, for example, the circuit breaker is installed into a panel or other electrical enclosure with metal doors that can obstruct the LED or a corresponding display. Maintenance personnel do not wish to open the metal doors to check for the lit LED, since if the LED is off, an arc flash could cause an un-safe condition that might result in serious injury or death. Hence, a solution to this problem is needed.

There is room for improvement in electrical switching apparatus, such as circuit interrupters.

There is also room for improvement in trip mechanisms, such as trip units, for circuit interrupters.

SUMMARY

These needs and others are met by embodiments of the disclosed concept, which provide an alternative fail-safe indication that an arc reduction maintenance mode has been remotely enabled.

In accordance with one aspect of the disclosed concept, an electrical switching apparatus comprises: separable contacts; an operating mechanism structured to open and close the separable contacts; and a trip mechanism cooperating with the operating mechanism to trip open the separable contacts, the trip mechanism comprising: an input structured to receive a remote signal to remotely enable an arc reduction maintenance mode, a first circuit structured to enable the arc reduction maintenance mode in response to the received remote signal, and a second circuit structured to provide an electrical signal remote from the trip mechanism in order to remotely indicate that the arc reduction maintenance mode is remotely enabled.

The first circuit may comprise a first relay including a first coil; the second circuit may comprise a second relay including a second coil; and the first and second coils may be electrically connected in series and structured to be energized by the received remote signal.

The first relay may be structured to be energized before the second relay is energized in order that the arc reduction maintenance mode is enabled before the second circuit provides the electrical signal remote from the trip mechanism.

The first coil of the first relay may have a first resistance and a first pickup voltage; the second coil of the second relay may have a second resistance and a second pickup voltage; and the first resistance, the first pickup voltage, the second resistance and the second pickup voltage may be structured in order that the first relay is energized before the second relay.

The first circuit may comprise the series combination of a zener diode, a light emitting diode and a resistor, the series combination being structured to light the light emitting diode at the same time or after the second relay is energized, in order to visually indicate that the arc reduction maintenance mode is enabled.

As another aspect of the disclosed concept, a trip unit is for a circuit interrupter for an electrical circuit. The trip unit comprises: an input structured to receive a remote signal to remotely enable an arc reduction maintenance mode; a first circuit structured to enable the arc reduction maintenance mode in response to the received remote signal; and a second circuit structured to provide an electrical signal remote from the trip mechanism in order to remotely indicate that the arc reduction maintenance mode is remotely enabled.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "processor" shall mean a programmable analog and/or digital device that can store, retrieve, and process data; a computer; a workstation; a personal computer; a microprocessor; a microcontroller; a microcomputer; an ASIC processor; a central processing unit; a mainframe computer; a mini-computer; a server; a networked processor; or any suitable processing device or apparatus.

As employed herein, the term "electrical signal" remote from a trip mechanism or trip unit shall mean a normally closed contact; a normally open contact; closed separable contacts; open separable contacts; an energized analog or digital electrical signal; or a non-energized analog or digital electrical signal.

As employed herein, the statement that two or more parts are "connected" or "coupled" together shall mean that the parts are joined together either directly or joined through one or more intermediate parts. Further, as employed herein, the statement that two or more parts are "attached" shall mean that the parts are joined together directly.

The disclosed concept is described in association with a three-pole circuit breaker, although the disclosed concept is applicable to a wide range of electrical switching apparatus having any number of poles.

Figure 1:
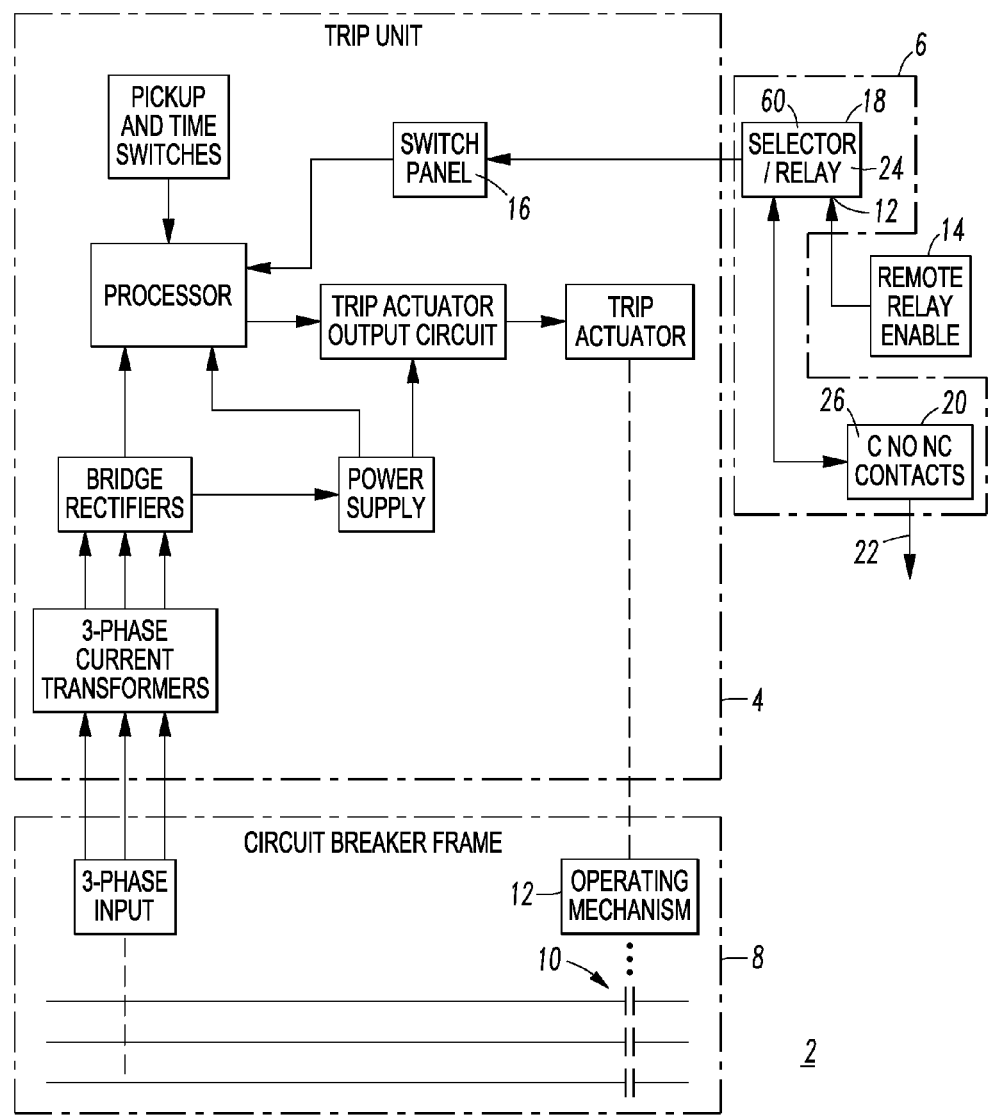
FIG. 1 is a block diagram in schematic form of an electrical switching apparatus including a trip mechanism and relay module in accordance with embodiments of the disclosed concept.

FIG. 1 shows an electrical switching apparatus or circuit interrupter, such as the example circuit breaker 2 for an electrical circuit. The circuit breaker 2 includes a trip mechanism, such as the example trip unit 4 having a relay module 6. The example circuit breaker 2 also includes a circuit breaker frame 8 having separable contacts 10 and an operating mechanism 12 structured to open and close the separable contacts 10. The trip unit 4 cooperates with the operating mechanism 12 to trip open the separable contacts 10. The trip unit 4 includes an input 12 structured to receive a remote enable signal 14 to remotely enable an arc reduction maintenance mode 16, a first circuit 18 (best shown in FIG. 2) structured to enable the arc reduction maintenance mode 16 in response to the received remote signal 14, and a second circuit 20 (best shown in FIG. 3) structured to provide an electrical signal 22 remote from the trip unit 4 in order to remotely indicate that the arc reduction maintenance mode 16 is remotely enabled.

Figure 2:
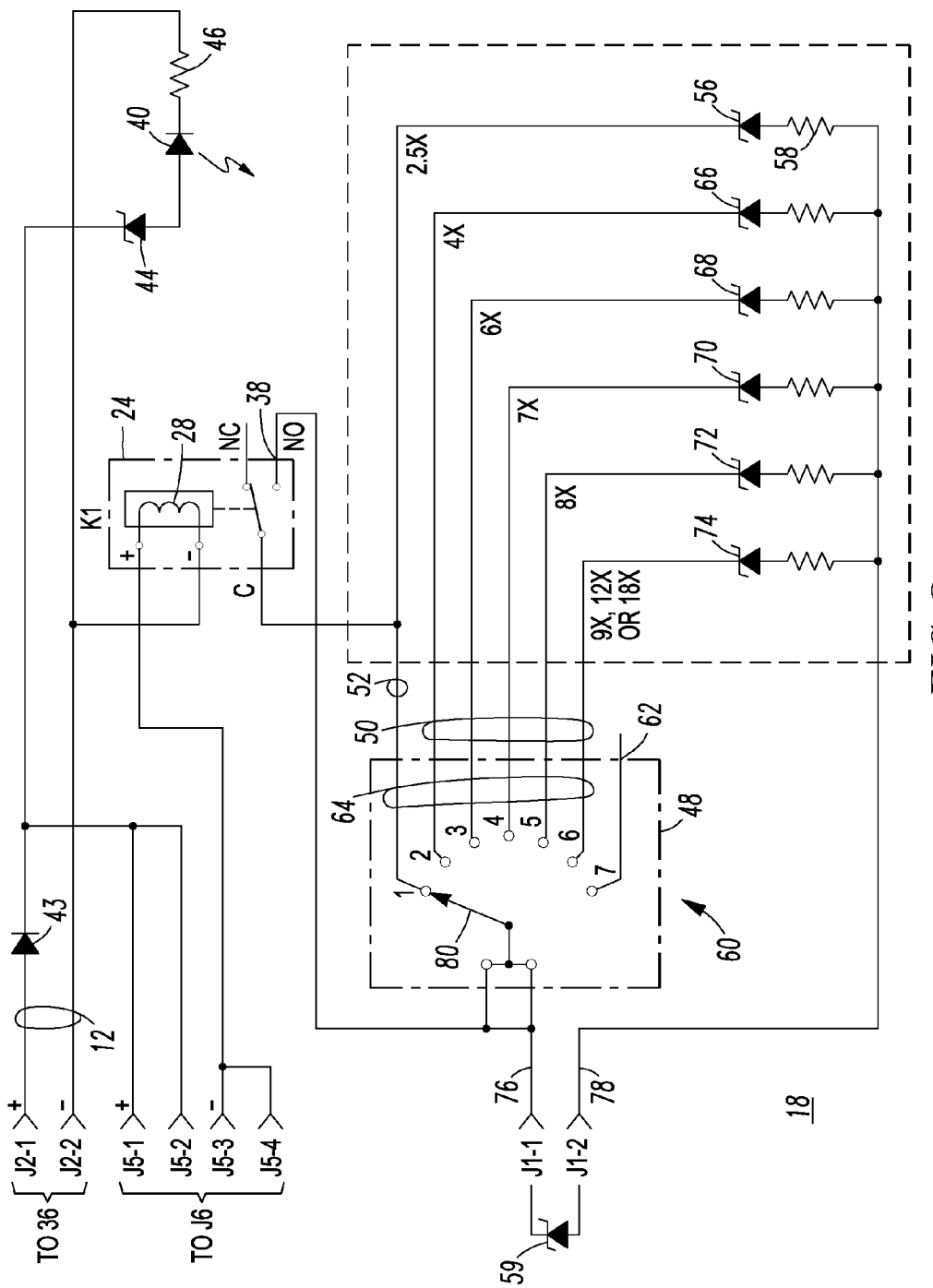
FIG. 2 is a block diagram in schematic form of a portion of the trip mechanism of FIG. 1.
Figure 3:
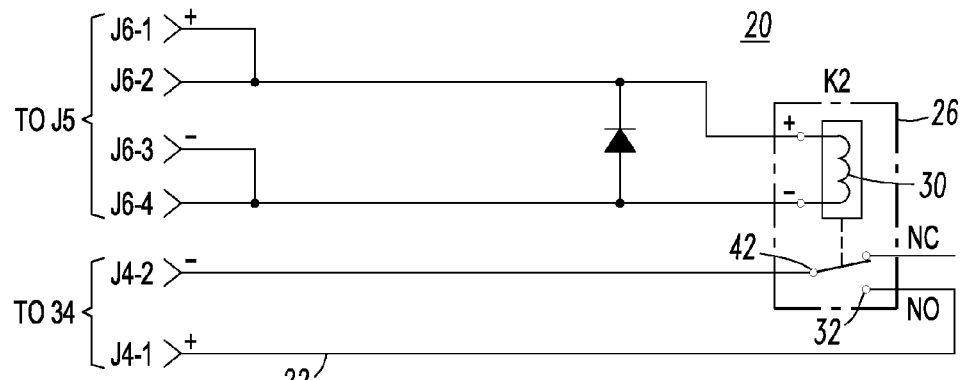
FIG. 3 is a block diagram in schematic form of the relay module of FIG. 1.
Figure 4:
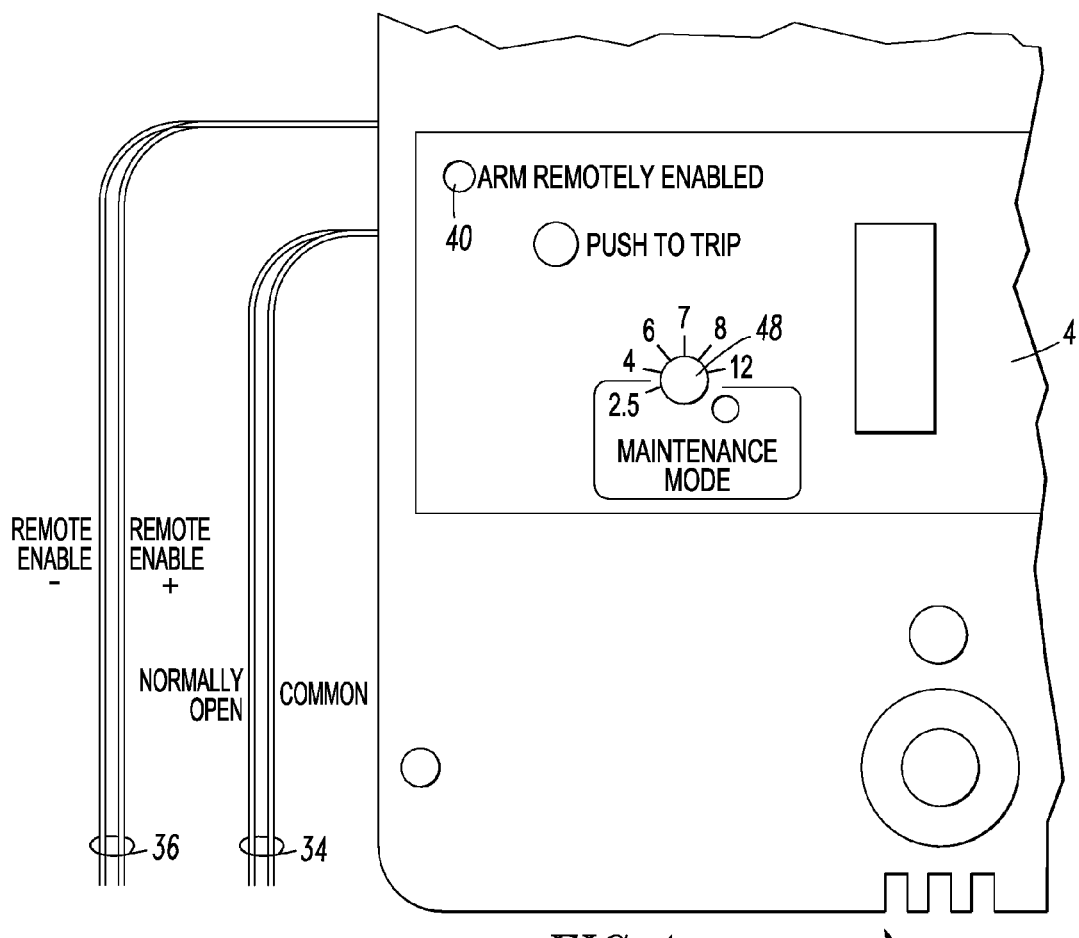
FIG. 4 is an isometric view of a circuit breaker including the trip mechanism and relay module of FIG. 1, and an interface to a remote device to enable or disable and provide a remote electrical signal for an arc reduction maintenance mode.

Referring to FIGS. 2 and 3, a portion of the trip unit 4 of FIG. 1 including the two circuits 18,20 is shown. The disclosed concept allows for redundant indication of the arc reduction maintenance mode 16 involving a first relay (K1) 24 of the first circuit 18 (FIG. 2) that cooperates with a second relay (K2) 26 of the second circuit 20 (FIG. 3). As shown in FIG. 1, the second relay (K2) 26 is located with (e.g., internal to; proximate) the trip unit 4. As will be described, the example relays 24,26 provide remote relay indication with a fail-safe feature provided by the coils 28,30 of the respective relays 24,26 being electrically connected in series. The example normally open (NO) contact 32 of the second relay 26 changes state (e.g., from open to closed) when the trip unit arc flash reduction setting has been remotely placed into the lowest position and, thus, the arc reduction maintenance mode 16 is remotely enabled. The example NO contact 32 is made available to the user from two conductors 34 that exit the circuit breaker 2 as shown in FIG. 4. Preferably, these conductors 34 are disposed on the same side as two conductors 36 that remotely enable the relays 24,26 for the arc reduction maintenance mode 16.

As will be explained, this remote contact indication from the second relay 26 cannot change state before the first relay 24 has been energized to close its example NO contact 38 and place the trip unit 4 into its lowest arc flash reduction mode setting. Therefore, the remote contact indication by the example NO contact 32 acts as a fail-safe indication mechanism for the user. An LED indication (e.g., without limitation, from the example blue LED 40) is available at the trip unit 4, and the second relay 26 with the fail-safe contact feature is provided to remotely indicate that the arc reduction maintenance mode 16 is remotely enabled.

The input 12 (FIGS. 1 and 2) is structured to receive the two conductors 36 (FIG. 4) to receive a suitable direct current voltage as the remote enable signal 14 (FIG. 2). The first circuit 18 includes the first relay 24 having the first coil 28, and the second circuit 20 includes the second relay 26 having the second coil 30. The first and second coils 28,30 are electrically connected in series by connectors J5-1/J5-2 (FIG. 2) being connected to connectors J6-1/J6-2 (FIG. 3), and connectors J5-3/J5-4 (FIG. 2) being connected to connectors J6-3/J6-4 (FIG. 3).

The first and second coils 28,30 are structured to be energized by the received remote signal 14 from the conductors 36. The second circuit 20 (FIG. 3) includes the two conductors 34 to output the example NO contact 32 and a common 42 as the electrical signal 22 (FIG. 1) remote from the trip unit 4. The first circuit 18 (FIG. 2) also includes a visual indicator, such as the example LED 40, structured to visually indicate that the arc reduction maintenance mode 16 is remotely enabled. The first circuit 18 further includes the series combination of a zener diode 44, the LED 40 and a resistor 46. This series combination is structured to light the LED 40 at the same time or after the second relay 26 is energized, in order to visually indicate that the arc reduction maintenance mode 16 is already enabled. The first circuit 18 still further includes a manually operable selector 48 structured to select one of a plurality of predetermined current conditions 50, each of the predetermined current conditions 50 (e.g., 4×, 6×, 7×, 8× or 9× maximum rated current) being greater than a current condition 52 (e.g., 2.5× maximum rated current) of the arc reduction maintenance mode 16. The first relay 24 of the first circuit 18 is structured to override the manually operable selector 48.

Referring to FIGS. 2 and 3, the electrical signal 22 remote from the trip unit 4 is provided by the example NO contact 32 and occurs after the trip unit 4 has entered its lowest instantaneous setting (e.g., 2.5 times (2.5×) the circuit breaker frame rating (maximum rated current)). The example first relay (K1) 24 has, for example, a 12 volt relay coil 28, and the example second relay (K2) 26 has, for example, a 9 volt relay coil 30. As will be explained, K1 is closed first since the K1 pickup voltage, K1 coil resistance, K2 pickup voltage and K2 coil resistance are suitably structured. For example and without limitation, the coil resistance of K2 is about 579Ω, while the coil resistance of K1 is about 1028Ω. Also, the pickup voltage of each of the relays K1,K2 is different. K2 has a pickup voltage of about 6.7 V, while K1 has a pickup voltage of about 7.2 V. For example, with an input voltage of 11.6 V from the conductors 36, the voltage of K1 is about 7.4 V and the voltage of K2 is about 4.2 V. Hence, K1 is picked first and K2 is not picked. When the input voltage is increased to 18.6 V in this example, the voltage of K1 is about 11.9 V and the voltage of K2 is about 6.7 V. Therefore, this is the example threshold point at which both relays K1 and K2 are picked. This permits the arc reduction maintenance mode 16 to be enabled before the second circuit 20 provides the electrical signal 22 remote from the trip unit 4.

The first relay 24 sets the trip unit 4 into its lowest setting (2.5×) by paralleling zener diode 56 and series resistor 58 across a main override diode 59 (FIG. 2) which is located on a main trip mechanism printed circuit board (not shown). An example of the main override diode and the main trip mechanism printed circuit board is disclosed in U.S. Patent Application Publication No. 2009/0195337, which is incorporated by reference herein. For example and without limitation, the zener value of zener diode 56 is about 1.8 V, while the zener values of the other five example zener diodes 66,68,70,72,74 are larger (e.g., without limitation, 3.9 V to 9.1 V).

If, for example, 24 VDC is applied to connectors J2-1 and J2-2 by the conductors 36, then both relays 24 (K1) and 26 (K2) close and the lowest setting (2.5×) will be achieved internally from K1 NO contact 38 being closed to select zener diode 56 and series resistor 58, with the electrical signal 22 remote from the trip unit 4 being provided by the closed NO contact 32 of K2. The local indication is provided by the lit LED 40. The NO contact 32 and common 42 exit the circuit breaker 2 from connectors J4-1 and J4-2. The conductors 34 connected thereto are from the NO contact 32 and the common 42 of relay K2. This closure is used to notify maintenance people stationed away from the circuit breaker 2 that it is safe to approach the circuit breaker 2 for service or to change settings. For example, connector J2-1 is +24 VDC and connector J2-2 is ground to provide the remote enable signal 14. The LED 40 is energized via the path from +24 VDC at connector J2-1 through diode 43, zener diode 44, LED 40 and resistor 46 to ground at connector J2-2. The LED 40 will not light until, for example, about 18.6 VDC to about 19.0 VDC is applied to connectors J2-1/J2-2 having the correct polarity.

If the example 24 VDC voltage is slowly ramped up, then at about 11.6 V, the relay K1 closes and the K2 (safe indication) from NO contact 32 remains open. At approximately 18.6 V, both relays K1 and K2 are energized and, also, the LED 40 is lit. Therefore, maintenance personnel will not get either the lit LED safe indication or the NO contact 32 closure from K2 (safe indication) before K1 is closed to cause the trip unit 4 to enter the lowest maintenance mode setting (2.5×).

FIG. 4 shows the circuit breaker 2 including the trip unit 4 (and relay module 6 of FIG. 1), and an interface to a remote device to enable, disable and indicate the arc reduction maintenance mode 16. The circuit breaker 2 includes the conductors 34 from the trip unit 4 and the conductors 36 to the trip unit 4.

As shown in FIG. 2, a circuit 60 advantageously overrides various trip curves for a selected one of five example currents between about four (4×) and about twelve (e.g., 9×, 12× or 18×) times the maximum rated current. The example seven-position selector switch 48 includes one input 62 that corresponds to an open circuit, and six inputs 64 that receive the cathodes of the six different zener diodes 56,66,68,70,72,74. The circuit 60 includes two outputs 76,78, which are respectively electrically connected to a movable arm 80 and to the anodes (via resistors such as 58) of the different zener diodes 56,66,68,70,72,74. In turn, the lowest selected zener voltage level (either manually via the selector switch 48 or remotely via the NO contact 38) determines the instantaneous trip level. The desired one of the zener diodes 56,66,68,70,72,74 is switched in and out through the selector switch 48, or the zener diode 56 is switched in via the closed state of the NO contact 38.

The disclosed concept provides an alternative fail-safe indication that a circuit breaker or trip mechanism arc reduction maintenance mode has been remotely enabled and that the trip mechanism has been set to its lowest maintenance mode setting.

Although separable contacts 10 are disclosed, suitable solid state separable contacts may be employed. For example, the disclosed circuit breaker 2 includes a suitable circuit interrupter mechanism, such as the separable contacts 10 that are opened and closed by the operating mechanism 12, although the disclosed concept is applicable to a wide range of circuit interruption mechanisms (e.g., without limitation, solid state switches like FET or IGBT devices; contactor contacts) and/or solid state based control/protection devices (e.g., without limitation, drives; soft-starters; DC/DC converters) and/or operating mechanisms (e.g., without limitation, electrical, electro-mechanical, or mechanical mechanisms).

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An electrical switching apparatus comprising:
separable contacts;
an operating mechanism structured to open and close said separable contacts; and
a trip mechanism cooperating with said operating mechanism to trip open said separable contacts, said trip mechanism comprising:
an input structured to receive a remote signal to remotely enable an arc reduction maintenance mode,
a first circuit structured to enable said arc reduction maintenance mode in response to the received remote signal, and
a second circuit structured to provide an electrical signal remote from said trip mechanism in order to remotely indicate that said arc reduction maintenance mode is remotely enabled,
wherein said input is further structured to receive two conductors to receive a direct current voltage as the remote signal; and wherein said second circuit comprises two conductors to output a contact and a conductor cooperating with the contact as the electrical signal remote from said trip mechanism.

2. The electrical switching apparatus of claim 1 wherein said first circuit comprises a visual indicator structured to visually indicate that said arc reduction maintenance mode is enabled.

3. The electrical switching apparatus of claim 1 wherein said first circuit comprises a manually operable selector structured to select one of a plurality of predetermined current conditions, each of said predetermined current conditions being greater than a current condition of said arc reduction maintenance mode; and wherein said first circuit is further structured to override said manually operable selector.

4. An electrical switching apparatus comprising:
separable contacts;
an operating mechanism structured to open and close said separable contacts; and
a trip mechanism cooperating with said operating mechanism to trip open said separable contacts, said trip mechanism comprising:
an input structured to receive a remote signal to remotely enable an arc reduction maintenance mode,
a first circuit structured to enable said arc reduction maintenance mode in response to the received remote signal, and
a second circuit structured to provide an electrical signal remote from said trip mechanism in order to remotely indicate that said arc reduction maintenance mode is remotely enabled,
wherein said first circuit comprises a first relay including a first coil; wherein said second circuit comprises a second relay including a second coil; and wherein said first and second coils are electrically connected in series and are structured to be energized by the received remote signal.

5. The electrical switching apparatus of claim 4 wherein said second relay further includes a contact that changes state when said arc reduction maintenance mode is remotely enabled.

6. The electrical switching apparatus of claim 4 wherein said second relay is located internal to said trip mechanism.

7. The electrical switching apparatus of claim 4 wherein said first relay is structured to be energized before said second relay is energized in order that said arc reduction maintenance mode is enabled before said second circuit provides the electrical signal remote from said trip mechanism.

8. The electrical switching apparatus of claim 4 wherein the first coil of said first relay has a first resistance and a first pickup voltage; wherein the second coil of said second relay has a second resistance and a second pickup voltage; and wherein said first resistance, said first pickup voltage, said second resistance and said second pickup voltage are structured in order that said first relay is energized before said second relay.

9. The electrical switching apparatus of claim 4 wherein said first circuit comprises the series combination of a zener diode, a light emitting diode and a resistor, said series combination being structured to light the light emitting diode at the same time or after said second relay is energized, in order to visually indicate that said arc reduction maintenance mode is enabled.

10. A trip unit for a circuit interrupter for an electrical circuit, said trip unit comprising:
an input structured to receive a remote signal to remotely enable an arc reduction maintenance mode;
a first circuit structured to enable said arc reduction maintenance mode in response to the received remote signal; and
a second circuit structured to provide an electrical signal remote from said trip unit in order to remotely indicate that said arc reduction maintenance mode is remotely enabled,
wherein said input is further structured to receive two conductors to receive a direct current voltage as the remote signal; and wherein said second circuit further comprises two conductors to output a contact and a conductor cooperating with the contact as the electrical signal remote from said trip mechanism.

11. The trip unit of claim 10 wherein said first circuit comprises a visual indicator structured to visually indicate that said arc reduction maintenance mode is enabled.

12. The trip unit of claim 10 wherein said first circuit comprises a manually operable selector structured to select one of a plurality of predetermined current conditions, each of said predetermined current conditions being greater than a current condition of said arc reduction maintenance mode; wherein said first circuit is structured to override said manually operable selector; and wherein said first circuit is further structured to select the current condition of said arc reduction maintenance mode in response to the received remote signal.

13. A trip unit for a circuit interrupter for an electrical circuit, said trip unit comprising:
an input structured to receive a remote signal to remotely enable an arc reduction maintenance mode;
a first circuit structured to enable said arc reduction maintenance mode in response to the received remote signal; and a second circuit structured to provide an electrical signal remote from said trip unit in order to remotely indicate that said arc reduction maintenance mode is remotely enabled, wherein said first circuit comprises a manually operable selector structured to select one of a plurality of predetermined current conditions, each of said predetermined current conditions being greater than a current condition of said arc reduction maintenance mode; wherein said first circuit is structured to override said manually operable selector; wherein said first circuit is further structured to select the current condition of said arc reduction maintenance mode in response to the received remote signal;

wherein said current condition of said arc reduction maintenance mode is defined by the series combination of a zener diode and a resistor;

wherein said manually operable selector is further structured to electrically connect the series combination of the zener diode and the resistor in parallel with another zener diode; and wherein said first circuit comprises a relay energized by the received remote signal, said relay including a contact structured to electrically connect the series combination of the zener diode and the resistor in parallel with said another zener diode when said input receives the remote signal.

14. A trip unit for a circuit interrupter for an electrical circuit, said trip unit comprising:

an input structured to receive a remote signal to remotely enable an arc reduction maintenance mode;

a first circuit structured to enable said arc reduction maintenance mode in response to the received remote signal; and a second circuit structured to provide an electrical signal remote from said trip unit in order to remotely indicate that said arc reduction maintenance mode is remotely enabled wherein said first circuit comprises a first relay including a first coil; wherein said second circuit comprises a second relay including a second coil; and wherein said first and second coils are electrically connected in series and are structured to be energized by the received remote signal.

15. The trip unit of claim 14 wherein said second relay further includes a contact that changes state when said arc reduction maintenance mode is remotely enabled.

16. The trip unit of claim 14 wherein said second relay is located internal to said trip mechanism.

17. The trip unit of claim 14 wherein said first relay is structured to be energized before said second relay is energized in order that said arc reduction maintenance mode is enabled before said second circuit provides the electrical signal remote from said trip mechanism that said arc reduction maintenance mode is remotely enabled.

18. The trip unit of claim 14 wherein the first coil of said first relay has a first resistance and a first pickup voltage; wherein the second coil of said second relay has a second resistance and a second pickup voltage; and wherein said first resistance, said first pickup voltage, said second resistance and said second pickup voltage are structured in order that said first relay is energized before said second relay.

19. The trip unit of claim 14 wherein said first circuit comprises the series combination of a zener diode, a light emitting diode and a resistor, said series combination being structured to light the light emitting diode at the same time or after said second relay is energized, in order to visually indicate that said arc reduction maintenance mode is enabled.

* * * * *